(12) United States Patent
Moon et al.

(10) Patent No.: US 12,502,996 B2
(45) Date of Patent: Dec. 23, 2025

(54) VEHICLE CHARGING SYSTEM THROUGH ESS AND METHOD AND APPARATUS FOR MANAGING THE SAME

(71) Applicants: HYUNDAI MOTOR COMPANY, Seoul (KR); KIA CORPORATION, Seoul (KR)

(72) Inventors: Dong Hyun Moon, Gwangju (KR); Sueng Ho Lee, Seoul (KR); Dong Hwan Kwak, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 679 days.

(21) Appl. No.: 17/948,418

(22) Filed: Sep. 20, 2022

(65) Prior Publication Data
US 2023/0347771 A1    Nov. 2, 2023

(30) Foreign Application Priority Data
Apr. 27, 2022    (KR) ........................ 10-2022-0052244

(51) Int. Cl.
*B60L 53/62*        (2019.01)
*B60L 53/126*       (2019.01)
(Continued)

(52) U.S. Cl.
CPC ............. *B60L 53/62* (2019.02); *B60L 53/126* (2019.02); *B60L 53/305* (2019.02); *B60L 53/51* (2019.02); *B60L 53/66* (2019.02)

(58) Field of Classification Search
CPC .......... B60L 53/53; B60L 53/12; B60L 53/66; B60L 53/665; B60L 53/57; B60L 53/122;
(Continued)

(56) References Cited

U.S. PATENT DOCUMENTS

| | | | | |
|---|---|---|---|---|
| 5,669,470 A | * | 9/1997 | Ross | ..................... B60L 53/126 320/109 |
| 8,676,400 B2 | * | 3/2014 | Tippelhofer | ........ B60L 15/2045 701/1 |

(Continued)

FOREIGN PATENT DOCUMENTS

| | | | | |
|---|---|---|---|---|
| EP | 2730451 A1 | * | 5/2014 | ............. B60L 53/39 |
| KR | 102239780 B1 | | 4/2021 | |
| WO | WO-2013/068537 A2 | * | 5/2013 | ............. H01F 38/14 |

*Primary Examiner* — Jared Fureman
(74) *Attorney, Agent, or Firm* — Lempia Summerfield Katz LLC

(57) ABSTRACT

Disclosed are a vehicle charging system through an ESS, a method and an apparatus for managing the same. The method includes the steps of: confirming the presence of a wireless charging vehicle in which the power is charged by supplied wirelessly from the ESS on the road where the power is supplied by the ESS; receiving vehicle data including an amount of charging required from the wireless charging vehicle, where the wireless charging vehicle is present on the road after confirmation; receiving power data including an amount of remaining power from the ESS; determining whether a charging completion of the wireless charging vehicle by the ESS is possible based on the vehicle data and the power data; and controlling the ESS to charge the wireless charging vehicle in the case of the charging completion of the wireless charging vehicle is possible.

18 Claims, 5 Drawing Sheets

(51) Int. Cl.
  *B60L 53/30* (2019.01)
  *B60L 53/51* (2019.01)
  *B60L 53/66* (2019.01)

(58) Field of Classification Search
  CPC ...... B60L 53/126; B60L 53/62; B60L 53/305; B60L 53/51; H02J 50/40; H02J 3/322; H02J 7/0063; H02J 7/0068; H02J 50/10; H02J 50/90
  See application file for complete search history.

(56) References Cited

U.S. PATENT DOCUMENTS

| | | | | |
|---|---|---|---|---|
| 8,706,312 B2* | 4/2014 | Littrell | .................. | B60L 53/665 |
| | | | | 700/297 |
| 9,744,871 B2* | 8/2017 | Sabripour | ............... | B60L 53/67 |
| 9,994,118 B2* | 6/2018 | Williams | ................ | B60L 58/12 |
| 10,160,339 B2* | 12/2018 | Ricci | .................. | G01C 21/3469 |
| 10,183,583 B2* | 1/2019 | Narla | .................. | B60L 53/00 |
| 10,183,584 B2* | 1/2019 | Ricci | ..................... | B60L 53/32 |
| 10,727,693 B2* | 7/2020 | Wang | ................... | H02J 50/402 |
| 10,759,281 B2* | 9/2020 | Miller | .................. | H02J 7/1438 |
| 10,790,692 B2* | 9/2020 | Ahmed | .................. | B60L 53/12 |
| 11,059,380 B2* | 7/2021 | Wang | ..................... | B60L 5/005 |
| 11,117,486 B2* | 9/2021 | Logvinov | ............... | B60L 53/64 |
| 11,214,163 B2* | 1/2022 | Moghe | .................... | H02J 50/00 |
| 11,273,727 B2* | 3/2022 | Mortensen | ............ | B60L 53/16 |
| 11,318,845 B2* | 5/2022 | Rumbak | ................ | B60L 5/005 |
| 11,719,547 B2* | 8/2023 | Treadway | .............. | B60L 53/68 |
| | | | | 701/423 |
| 11,801,767 B2* | 10/2023 | Salter | ..................... | H02J 3/322 |
| 11,850,952 B2* | 12/2023 | Takahashi | ............... | H02J 50/90 |
| 12,322,980 B2* | 6/2025 | Nakayashiki | ........... | H02J 50/90 |
| 12,344,118 B2* | 7/2025 | Yang | ...................... | H02J 50/80 |
| 12,407,193 B2* | 9/2025 | Takita | ................... | H02J 50/70 |
| 2012/0293109 A1* | 11/2012 | Glazer | ..................... | H02J 7/28 |
| | | | | 290/55 |
| 2016/0023557 A1* | 1/2016 | Dimke | .................... | B60L 53/36 |
| | | | | 320/108 |
| 2021/0203271 A1* | 7/2021 | Xu | .......................... | H02S 40/36 |
| 2023/0214946 A1* | 7/2023 | Makino | ............ | G06Q 10/06316 |
| | | | | 705/7.26 |
| 2023/0278451 A1* | 9/2023 | Ehara | ..................... | B60L 53/62 |
| | | | | 320/109 |
| 2023/0323610 A1* | 10/2023 | Botts | .................. | H01M 10/425 |
| | | | | 404/71 |
| 2024/0424922 A1* | 12/2024 | Obayashi | ................ | H02J 50/80 |
| 2025/0153591 A1* | 5/2025 | McCalmont | ............ | B60L 53/51 |

* cited by examiner

VEHICLE CHARGING SYSTEM THROUGH ESS AND METHOD AND APPARATUS FOR MANAGING THE SAME

CROSS REFERENCE TO RELATED APPLICATION

The present application claims priority to Korean Patent Application No. 10-2022-0052244, filed Apr. 27, 2022, the entire contents of which are incorporated herein by reference.

TECHNICAL FIELD

The present disclosure relates to a vehicle charging system through an energy storage system (ESS) capable of adjusting the power supply of the energy storage system (ESS). The present disclosure also relates to a method and an apparatus for managing the same.

BACKGROUND

As automobile technology transforms from an internal combustion engine to an electric vehicle, various studies on electric vehicle-related technologies are being carried out. In particular, various methods have been proposed regarding a charging technology that is core to electric vehicle technology and is most directly connected to the supply of electric vehicles.

The charging technology is directly related to the convenience of using electric vehicles, but also to the future environment of the earth and the energy policies of each country. The ESS for storing and supplying energy becomes a widely used technology to improve energy efficiency. The ESS can supply power by combining environment-friendly renewable energy sources, including solar and wind power, or can store power when the cost is low and supply power at peak times to ensure efficiency in power distribution and cost aspects.

In the conventional charging method, the electric vehicle and the like are charged by receiving power from a power plant and through a wire unidirectionally. Using such a method, a path to supply power may be longer and is complex, causing power losses. There is also a burden on cost and space due to the installation of related facilities.

In addition, even when power is supplied wirelessly through a wireless power supply means installed along the road, there may be some problems, including in the case of there are vehicles that do not require charging on the road, the power is supplied causing a power loss, or there may be adjustment in supplying power through a separate process.

The foregoing is intended merely to aid in the understanding of the background of the present disclosure. The foregoing is not intended to mean that the present disclosure falls within the purview of the related art that is already known to those having ordinary skill in the art.

SUMMARY

The present disclosure provides a vehicle charging system through an energy storage system (ESS), a method, and an apparatus for managing the same. In the ESS, method, and the apparatus, the power stored in the ESS is wirelessly supplied to the vehicle through the power supply unit installed in the road network, and the vehicle and the ESS are controlled to be linked through the charging management apparatus. Thus, there are some improvements on energy efficiency by shortening the power supply path and reducing the process, as well as adjusting power supply through linkage with the vehicle compared to conventional charging technology.

To accomplish the above object, one aspect of the present disclosure provides a method for managing a vehicle charging system through an ESS according to the present disclosure. The method comprises confirming a presence of a wireless charging vehicle. The wireless charging vehicle is charged with the power wirelessly from the ESS on a road on which the wireless charging vehicle travels. The method also comprises in response to confirming the presence of the wireless charging vehicle on the road, receiving vehicle data including an amount of charging required from the wireless charging vehicle. The method also comprises receiving power data including an amount of remaining power from the ESS. The method also comprises determining whether a charging completion of the wireless charging vehicle by the ESS is possible based on the vehicle data and the power data. The method comprises in response to determining that the charging completion of the wireless charging vehicle by the ESS is possible, controlling the ESS to supply power to the wireless charging vehicle.

The method for managing a vehicle charging system further comprises controlling the ESS to cut off the power supply when the wireless charging vehicle is not present on the road after confirming the presence of the wireless charging vehicle that can be charged by receiving power wirelessly supplied from the ESS on the road supplied with the ESS.

After controlling the ESS is cut off, the method may comprise returning to confirming the presence of the wireless charging vehicle in which the power is charged by supplied wirelessly from the ESS on the road.

The method comprises determining that the charging completion of the wireless charging vehicle by the ESS is possible when the amount of power required is greater than or equal to the amount of remaining power by comparing the amount of remaining power and the amount of power required.

The method for managing a vehicle charging system may further comprise confirming vehicle input information, including at least any one of a current location, a destination, a current power, or user's battery settings. The method may further comprise calculating the amount of charging required based on the input information of the vehicle. The method may further comprise calculating the amount of charging required based on a value obtained by subtracting the current an amount of power according to the vehicle input information from the amount of charging required.

Confirming the vehicle input information may include weather data on the input information. The method may further comprise calculating the expected amount of power generation expected to be supplied through solar power generation based on the input information. Calculating the amount of charging required is derived based on a value obtained by deducting the expected amount of power generation from a value obtained by subtracting the current amount of power from the amount of charging required.

The method for managing a vehicle charging system may further comprise receiving the weather data from an external server before calculating the expected amount of power generation.

Determining that the wireless charging can be completed by the ESS may determine that the wireless charging cannot be completed when the amount of remaining power is less than the amount of charging required for charging. The method may further comprise controlling the ESS to be charged by the system power when wireless charging is not possible.

The method for managing the vehicle charging system may further comprise transmitting a notification of not being able to complete charging to the wireless charging vehicle when determined that the wireless charging cannot be completed after determining whether charging the wireless charging vehicle by the ESS can be completed.

The method for managing the vehicle charging system may further comprise requesting the wireless charging vehicle to update the vehicle data when a predetermined time elapsed after starting the charging of the wireless charging vehicle by the ESS.

To accomplish the above object, another aspect of the present disclosure provides an apparatus for managing a vehicle charging system through an ESS according to the present disclosure. The apparatus comprises a monitoring unit confirming a presence of a wireless charging vehicle. The wireless charging vehicle is charged by receiving power wirelessly on a road on which the wireless charging vehicle travels. The apparatus further comprises a communication unit receiving vehicle data, including an amount of charging required from the wireless charging vehicle, and receiving a power data including an amount of remaining power from the ESS, in response to confirming the presence of the wireless charging vehicle on the road. The apparatus further comprises a determination unit determining whether a charging completion of the wireless charging vehicle by the ESS is possible based on the vehicle data and the power data. The apparatus further comprises a control unit controlling the power supply of the ESS and charging in response to determining that the charging completion of the wireless charging vehicle by the ESS is possible.

The determination unit may transmit a notification of not being able to complete charging when determined that completion of wireless charging is not possible.

The control unit may request the wireless charging vehicle to update the vehicle data when a predetermined time elapsed after charging.

To accomplish the above object, another aspect of the present disclosure provides a vehicle charging system through an ESS. The system comprises an ESS including a power supply unit implemented in a battery for storing the power and on the road. The ESS may supply the stored power to the vehicle. The system also comprises a wireless charging vehicle that is charged by receiving power wirelessly from the ESS. The system also comprises a charging management apparatus controlling the ESS. The charging management apparatus comprises a monitoring unit confirming a presence of a wireless charging vehicle. the wireless charging vehicle is charged by receiving power wirelessly on a road on which the wireless charging vehicle travels. The charging management apparatus also comprises a communication unit receiving vehicle data, including an amount of charging required from the wireless charging vehicle, and receiving a power data, including an amount of remaining power from the ESS in response to confirming the presence of the wireless charging vehicle on the road. The charging management apparatus also comprises a determination unit determining whether a charging completion of the wireless charging vehicle by the ESS is possible based on the vehicle data and the power data. The charging management apparatus also comprises a control unit in response to determining that the charging completion of the wireless charging vehicle by the ESS is possible, controlling the power supply of the ESS and charging.

The wireless charging vehicle may confirm vehicle input information, including at least any one of the current location, destination, current power, or user's battery settings, may calculate the amount of charging required based on the input information of the vehicle, and may transmit the vehicle data including the amount of charging required to the communication unit of the charging management apparatus.

The wireless charging vehicle may transmit the changed vehicle data to the charging management apparatus when there is any change in the vehicle data.

Weather data may be included in vehicle input information, and the wireless charging vehicle may receive the weather data from an external server.

The charging management apparatus may be included in the ESS.

The vehicle charging system through the ESS, the method, and the apparatus for managing the same according to the present disclosure may shorten the path and process for power supply through wireless charging, and the cooperative control of the vehicle and the ESS is achieved by the charging management apparatus. Therefore, adjusting the power supply to be optimized for each situation identified through vehicle data is possible. Thus, power loss may be prevented, and energy efficiency may be increased.

It should be appreciated by persons having ordinary skill in the art that that the effects that can be achieved with the present disclosure are not limited to what has been particularly described herein above and other advantages of the present disclosure should be more clearly understood from the following detailed description taken in conjunction with the accompanying drawings.

BRIEF DESCRIPTION OF THE DRAWINGS

In order that the disclosure may be well understood, there will now be described various forms thereof, given by way of example, reference being made to the accompanying drawings, in which.

Figure 1:
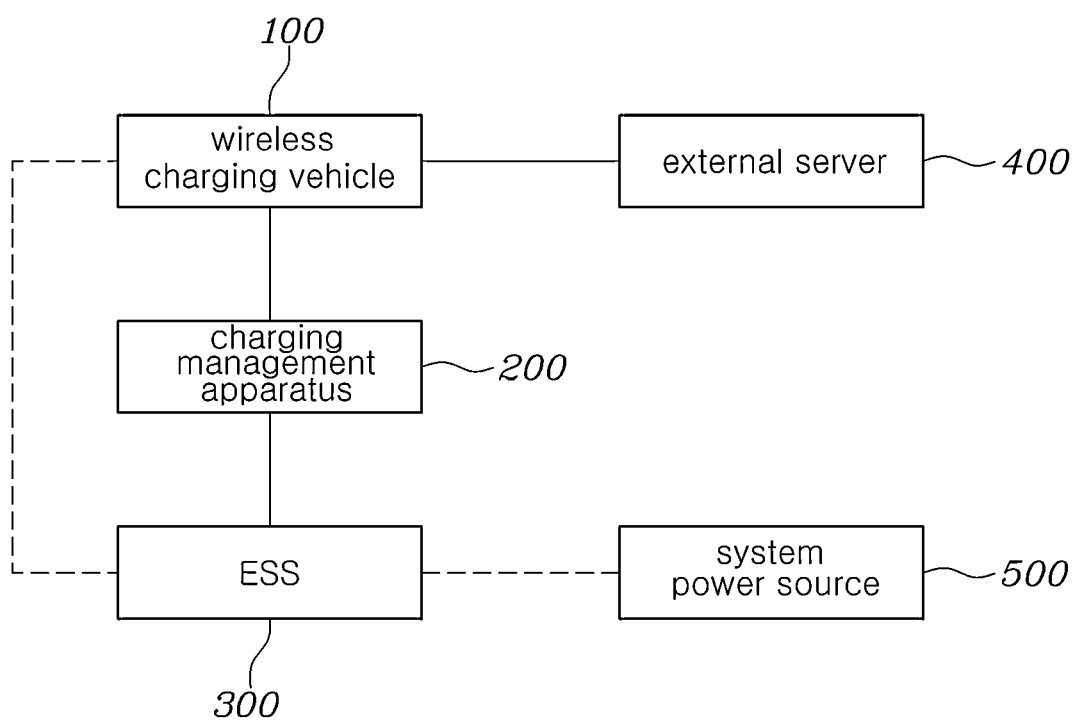
FIG. 1 is a configuration diagram showing a configuration of a vehicle charging system through an ESS according to an embodiment of the present disclosure.

The drawings described herein are for illustration purposes only and are not intended to limit the scope of the present disclosure in any way.

DETAILED DESCRIPTION OF THE DISCLOSURE

Regarding embodiments of the present disclosure disclosed in this specification or application, the specific structural or functional description is merely illustrative for the purpose of describing the embodiments of the disclosure, and the embodiments of the disclosure may be implemented in various forms. However, the disclosure should not be construed as being limited to the embodiments set forth in this specification or application.

Because the embodiments of the disclosure may be variously modified and have various forms, specific embodiments are illustrated in the drawings and described in detail in this specification or application. However, it should be understood that embodiments of the disclosure are intended not to be limited to the specific embodiments but to cover all modifications, equivalents, or alternatives without departing from the spirit and technical scope of the present disclosure.

Unless defined otherwise, all technical and scientific terms used herein have the same meaning as commonly understood by one of ordinary skill in the art to which this inventive concept belongs. It should be further understood that terms defined in commonly used dictionaries should be interpreted as having a meaning that is consistent with their meaning in the context of the related art and should not be interpreted in an idealized or overly formal sense unless expressly so defined herein.

Hereinafter, embodiments of the present disclosure are described in greater detail with reference to the accompanying drawings. Like numerals refer to like elements throughout. When a component, device, element, or the like of the present disclosure is described as having a purpose or performing an operation, function, or the like, the component, device, or element should be considered herein as being "configured to" meet that purpose or to perform that operation or function.

Figure 2:
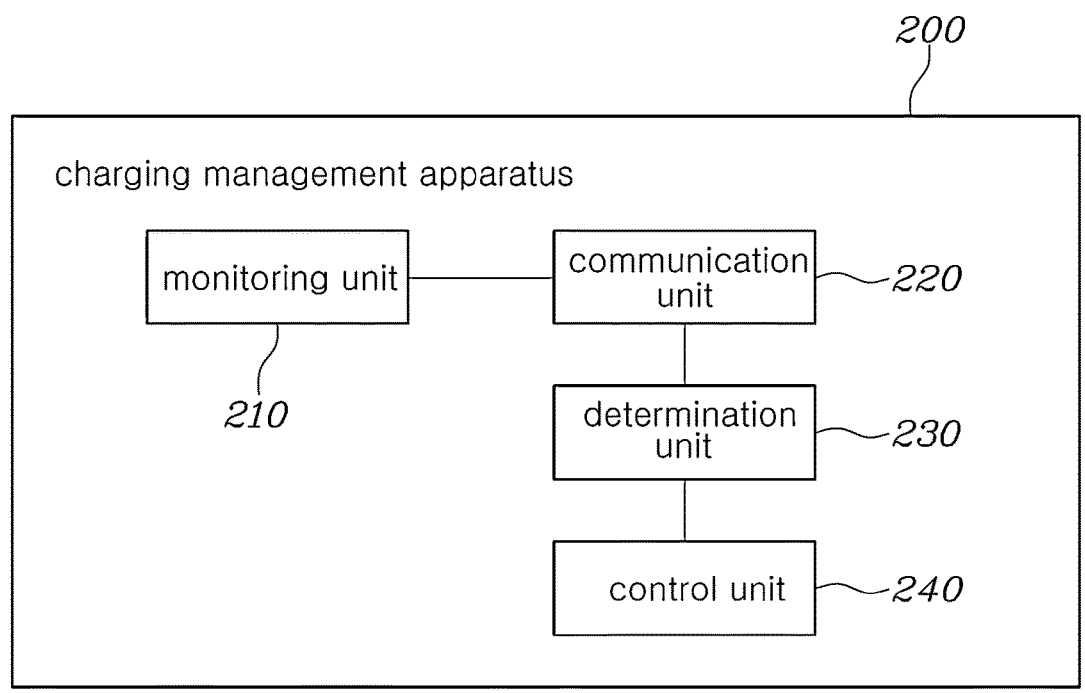
FIG. 2 is a configuration diagram showing a charging management apparatus of a vehicle through an ESS according to an embodiment of the present disclosure.
Figure 3:
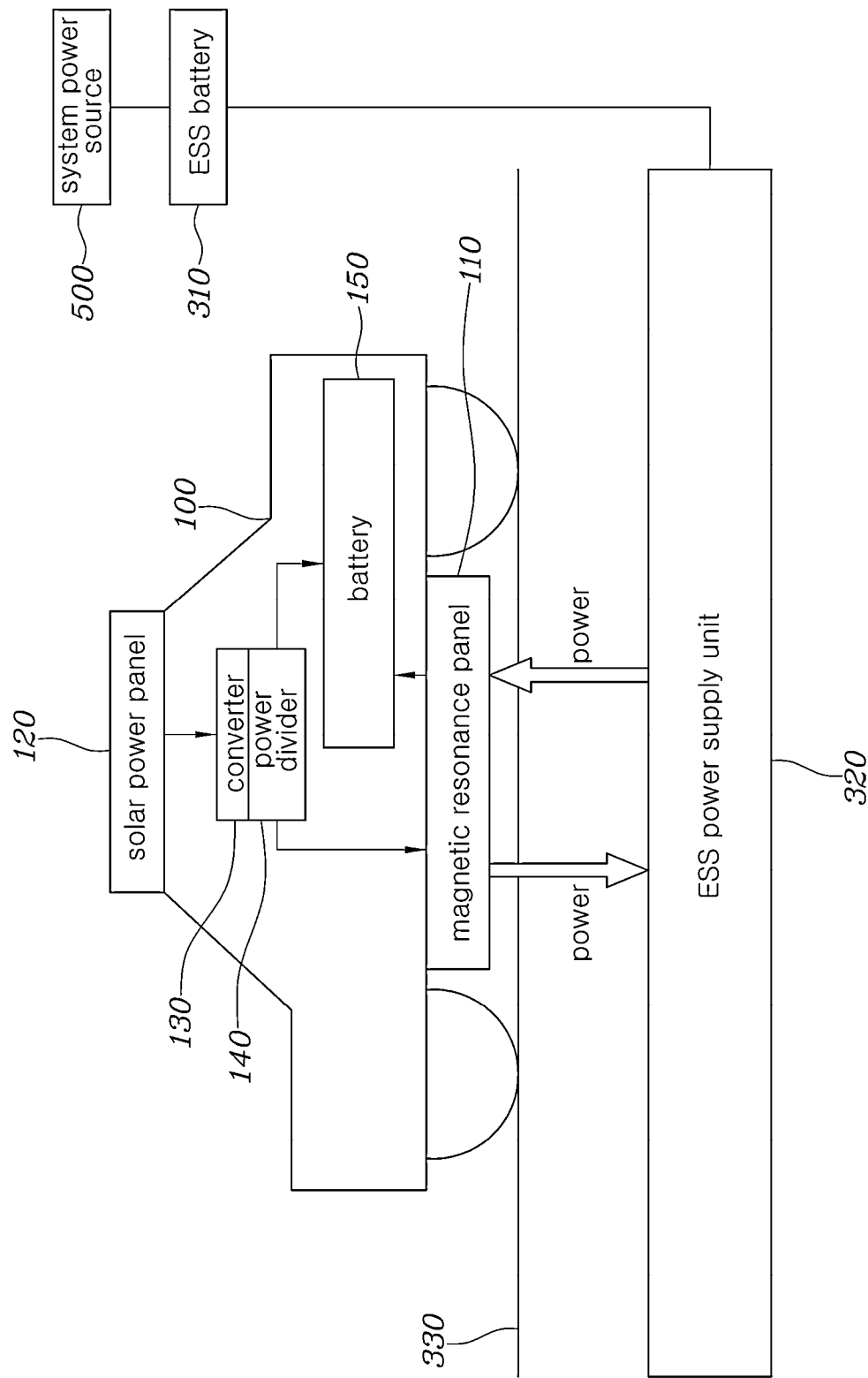
FIG. 3 is a view showing a state in which a wireless charging vehicle is charged in a vehicle charging system through an ESS according to an embodiment of the present disclosure.
Figure 4:
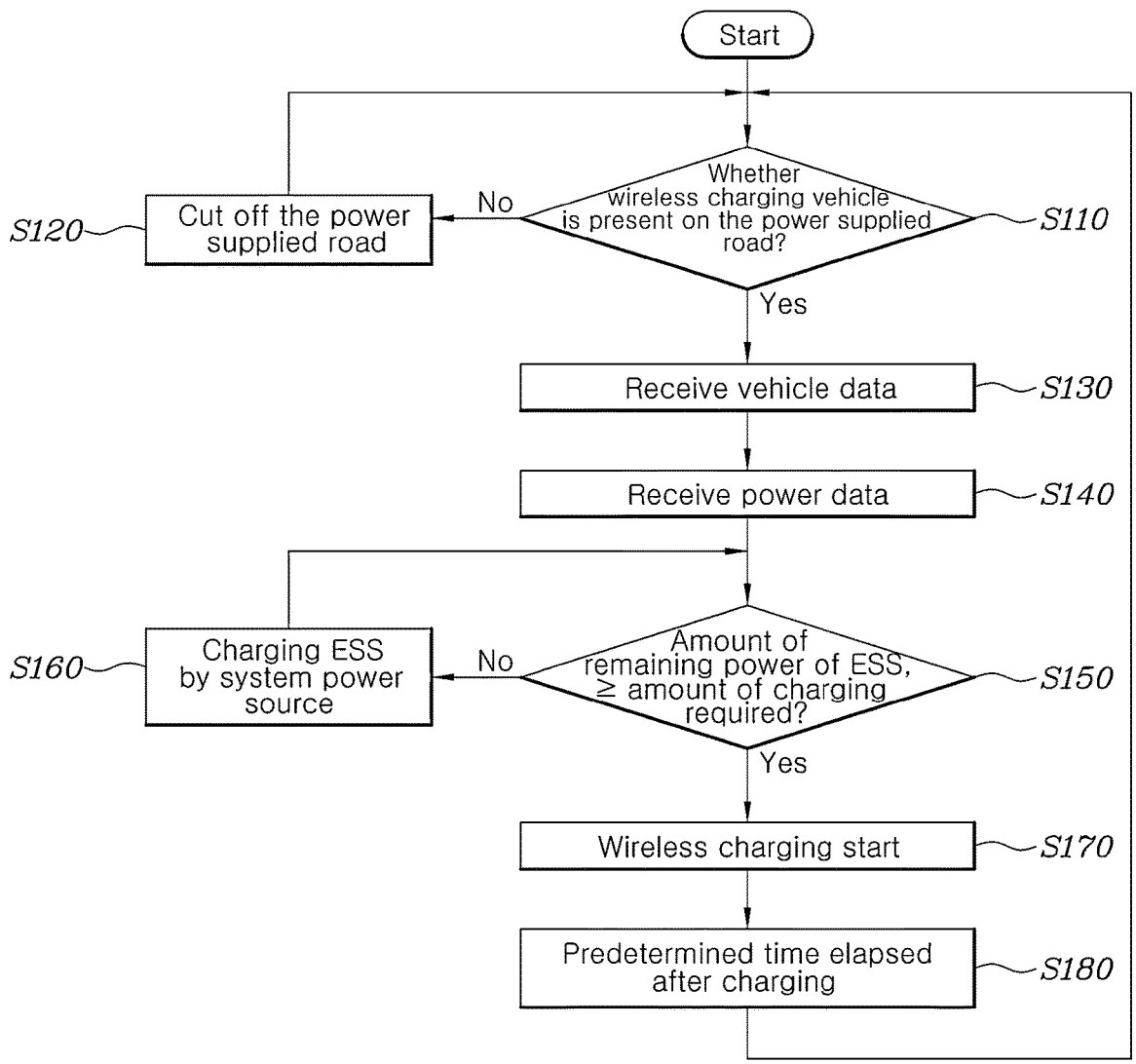
FIG. 4 is a flowchart showing a process performed in a charging management apparatus and an ESS in a method for managing a vehicle charging system through an ESS according to an embodiment of the present disclosure.
Figure 5:
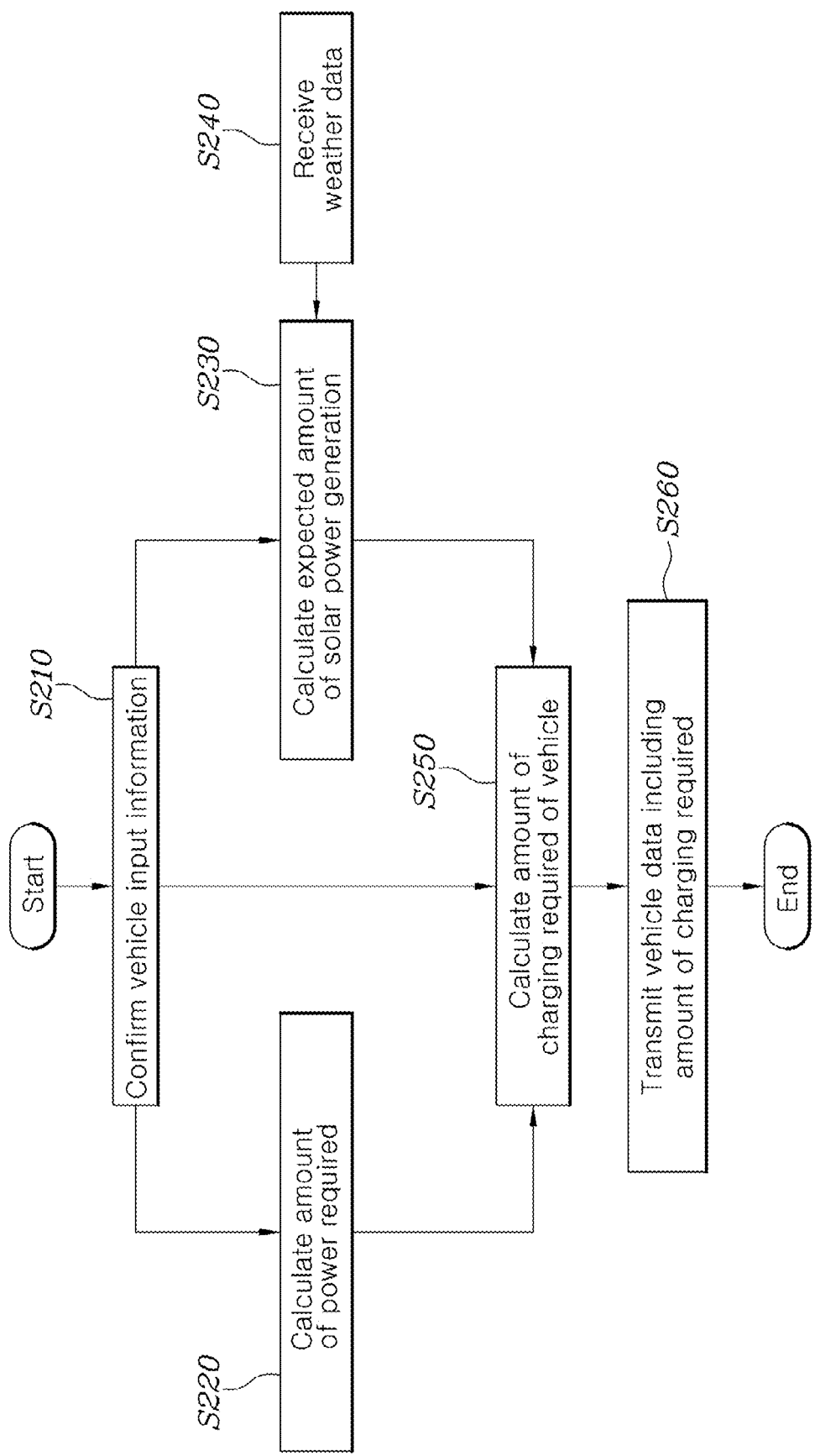
FIG. 5 is a flowchart showing a process performed in a wireless charging vehicle in a method for managing a vehicle charging system through an ESS according to an embodiment of the present disclosure.

FIG. 1 is a configuration diagram showing a configuration of a vehicle charging system through an energy storage system (ESS) according to an embodiment of the present disclosure. FIG. 2 is a configuration diagram showing a charging management apparatus of a vehicle through an ESS according to an embodiment of the present disclosure. FIG. 3 is a view showing a state in which a wireless charging vehicle is charged in a vehicle charging system through an ESS according to an embodiment of the present disclosure. FIG. 4 is a flowchart showing a process performed in a charging management apparatus and an ESS in a method for managing a vehicle charging system through an ESS according to an embodiment of the present disclosure. FIG. 5 is a flowchart showing a process performed in a wireless charging vehicle in a method for managing a vehicle charging system through an ESS according to an embodiment of the present disclosure.

Before describing a method for managing a vehicle charging system through an ESS according to embodiments of the present disclosure, a charging system applicable to the embodiments is first described with reference to FIG. 1.

FIG. 1 is a configuration diagram showing a configuration of a vehicle charging system through an ESS according to an embodiment of the present disclosure, and referring to FIG. 1, the vehicle charging system through the ESS may include a wireless charging vehicle 100, a charging management apparatus 200, an ESS 300, an external server 400 and a system power source 500. FIG. 1 is a view showing embodiments of the present disclosure and in terms of related components, it should be understood that an implementation of an actual charging management system apparatus may include additional components or fewer components than shown. Hereinafter, each component is described.

The wireless charging vehicle 100 is a vehicle that uses electrical energy charged from an electric power source as a power source. The wireless charging vehicle 100 may be charged by receiving electric power through a wire or may be charged wirelessly through solar power generation or magnetic resonance. The wireless charging vehicle 100 according to an embodiment of the present disclosure is charged by receiving power wirelessly by the ESS 300, and in this case, there is no need to deviate from the driving route and move to a charging site by receiving power while driving, or there is no need to invest extra time for charging.

In addition, the wireless charging vehicle 100 may confirm vehicle input information, including at least any one of a current location, a destination, a current power, or user's battery settings. The wireless charging vehicle 100 may calculate an amount of charging required based on the input information of the vehicle and provide the vehicle data including the amount of charging required to the charging management apparatus 200.

In addition, the wireless charging vehicle 100 may provide the changed vehicle data to the charging management apparatus 200 when there is any change in the vehicle data. Even if the vehicle data update is not requested, the wireless charging vehicle 100 actively transmits the vehicle data for the change to the charging management apparatus 200 to quickly respond to the changed conditions. It allows for securing the power supply efficiency.

At this time, the vehicle input information may include weather data, and the wireless charging vehicle 100 may receive the weather data from the external server 400. At this time, the received weather data may be utilized to calculate the expected power generation according to solar power generation. The external server 400 may be a server providing weather information, such as a server from the Korea Meteorological Administration. By utilizing the weather data provided from the external server 400 in calculating the expected power generation, the power generation according to the solar power generation can be accurately predicted, which is significantly affected by the weather condition.

The charging management apparatus 200 receives the vehicle data through communication with the wireless charging vehicle 100 and controls the power supply of the ESS 300 by a reflection. As the charging management apparatus 200 performs a cooperative control so that the wireless charging vehicle 100 and the ESS 300 are linked, the power supply of the ESS can be adjusted by reflecting the presence of the wireless charging vehicle and the amount of charging required. Therefore, the optimized power supply according to each situation can be made. A more detailed configuration of the charge management apparatus 200 is described later with reference to FIG. 2.

On the other hand, the charging management apparatus 200 in FIG. 1 is illustrated as a separate device distinguished from the ESS 300. However, according to another embodiment, the charging management apparatus 200 is included in the ESS 300. Accordingly, a control unit configured with the ESS 300 conventionally may be used as the charging management apparatus 200 and may be used as the charging management apparatus 200. Alternatively, a function may be added to the control unit that is already included in the wireless charging vehicle 100 and the ESS 300 instead of separately providing the charging management apparatus 200.

The ESS 300 may serve to receive and store power and then supply the power again. For example, as shown in FIG. 3, the ESS 300 stores the power in a battery 310, and the wireless charging vehicle 100 traveling on the road 330 may be charged through a power supply unit 320 implemented on the road 330. In this case, storing and supplying power of the ESS 300 can be controlled by the charging management apparatus 200.

FIG. 1 is a view showing an overall configuration of a charging system of a vehicle through an ESS of the present disclosure, in which the charging management apparatus 200 in the charging system is described in detail with reference to FIG. 2.

FIG. 2 is a configuration diagram showing a charging system management apparatus of a vehicle through an ESS according to an embodiment of the present disclosure. The charging management apparatus 200 of a vehicle comprises a monitoring unit 210 confirming the presence of a wireless charging vehicle that can be charged by receiving power wirelessly on a road where power is supplied by the ESS. The charging management apparatus 200 also comprises a communication unit 220 receiving vehicle data, including necessary charging amount from the wireless charging vehicle, and receiving a power data including a remaining amount of power from the ESS. The charging management apparatus 200 also comprises a determination unit 230 determining whether a charging completion of the wireless charging vehicle by the ESS is possible based on the vehicle data and the power data. The charging management apparatus 200 also comprises a control unit 240 controlling the power supply of the ESS and charging. It should be understood that an implementing an actual charging management system apparatus may include additional components or fewer components than shown. Hereinafter, each component is described.

The monitoring unit 210 confirms the presence of the wireless charging vehicle 100 that can be charged by receiving power wirelessly from the ESS 300 on the road 330 supplied with power by the ESS 300. Confirmation of the presence of the wireless charging vehicle 100 may be performed by sensing movement or weight through a sensor or by recognizing through a camera, or through communication with the wireless charging vehicle 100.

When the presence of the wireless charging vehicle 100 on the road 330 is confirmed through the monitoring unit 210, the communication unit 220 serves to receive vehicle data and power data from the wireless charging vehicle 100 and the ESS 300, respectively. At this time, the vehicle data includes the amount of charging required of the wireless charging vehicle 100, and the power data includes the amount of remaining power of the ESS 300. The received vehicle data and the power data may be provided to the determination unit 230 to determine whether a charging completion of the wireless charging vehicle 100 is possible.

The determination unit 230 determines whether a charging can be completed when charging the wireless charging vehicle 100 through the ESS 300 based on the vehicle data and the power data received from the wireless charging vehicle 100 and the ESS 300. As described above, whether charging can be completed may be determined by comparing the amount of charging required. Thereafter, the determination unit 230 provides the determination result to the control unit 240. The determination unit 230 may transmit a notification of not being able to complete charging when determined that a completion of wireless charging is not possible.

The control unit 240 may control and supply the power of the ESS 300 according to the determination result of the determination unit 230. When the charging can be completed, according to the determination result, the ESS 300 may be controlled to supply power. When the charging cannot be completed according to the determination result, the ESS 300 may be controlled to be charged, and in this case, the ESS 300 may be charged by the system power source 500. In addition, the control unit 240 may request the wireless charging vehicle to update and to receive the vehicle data when a predetermined time elapsed after charging.

FIG. 2 is a description of the configuration of the charging management apparatus of the vehicle through the ESS of the present disclosure, and the state in which the actual wireless charging vehicle 100 is charged through the ESS 300 is described in detail below with reference to FIG. 3.

FIG. 3 is a view showing a state in which the wireless charging vehicle is charged in the vehicle charging system through the ESS according to an embodiment of the present disclosure. In the charging system of the vehicle through the ESS of the present disclosure, the wireless charging vehicle 100 can be wirelessly charged by receiving power by solar power generation or magnetic resonance method. To this end, a magnetic resonance panel 110 for wireless charging through the ESS and a solar panel 120 for solar power generation. The power generated from the solar panel 120 is supplied via a converter 130 and a power divider 140. Some of the power are stored in a vehicle battery 150, and some of the power are transferred to the magnetic resonance panel 110, in which the magnetic resonance panel 110 allows to exchange the power with an ESS power supply unit 320 implemented on the road 330. The power supplied by the magnetic resonance panel 110 through the ESS power supply unit 320 is stored in the vehicle battery 150. Thus, the wireless charging vehicle 100 can be charged.

The ESS power supply unit 320 is implemented on the road 330 to supply power to a vehicle while traveling and supplies the power stored in the ESS battery 310 to the wireless charging vehicle 100. If the amount of remaining power in the ESS battery 310 is insufficient, the ESS battery 310 may be charged from the system power source 500, and the system power source can be a nearby power plant.

FIG. 3 shows a state in which the wireless charging vehicle 100 is charged by the ESS 300 in the vehicle charging system through the ESS of the present disclosure, and a method for controlling the ESS 300 by interlocking the wireless charging vehicle 100 and the ESS 300 through the charging management apparatus 200 is described in detail below with reference to FIG. 4.

FIG. 4 is a flowchart showing a process performed in the charging management apparatus and the ESS in a method for managing the vehicle charging system through the ESS according to an embodiment of the present disclosure. The method for managing the charging system of the vehicle through the ESS according to the present disclosure comprises confirming presence of a wireless charging vehicle 100 in which the power is charged by supplied wirelessly from the ESS on the road 330 where the power is supplied by the ESS (S110). The method also comprises receiving vehicle data including necessary charging amount from the wireless charging vehicle 100, where the wireless charging vehicle 100 is present on the road 330 after the confirmation result (S130). The method also comprises receiving power data including remaining amount of power from the ESS 300 (S140). The method also comprises determining whether a charging completion of the wireless charging vehicle by the ESS is possible based on the vehicle data and the power data (S150). The method also comprises controlling the ESS 300 to be charged in which the power is supplied to the wireless electric vehicle 100 in the case of the charging completion of the wireless charging vehicle is possible (S170). It should be understood that an implementation of an actual charging management system apparatus may include additional components or fewer components than shown. Hereinafter, each component is described.

Step S110 of confirming the presence of a wireless charging vehicle 100 in which the power is charged by supplied wirelessly from the ESS on the road 330 where the power is supplied by the ESS is performed by the monitoring unit 210 of the charging management apparatus 200 and confirms the presence of the wireless charging vehicle 100 to be charged on the road 330. From the result of confirmation, when the wireless charging vehicle 100 is present on the road 330, step S130 of receiving data including the amount of charging required from the wireless charging vehicle 100 and step S140 of receiving power data including the amount of remaining required from the ESS 300 are performed. Receiving the vehicle data and the power data is performed by the communication unit 210 of the charging management apparatus 200. Step S150 of determining whether the wireless charging vehicle is completed by the ESS is performed based on the received vehicle data and power data. As the determination result, when charging of the wireless charging vehicle is determined as to be possible, the wireless charging starts through step S170 of controlling the ESS so that the wireless charging vehicle 100 may be charged by receiving power.

Meanwhile, the method for managing a vehicle charging system through the ESS further comprises step S120 of controlling the ESS to cut off the power supply in the case of the wireless charging vehicle 100 is not present on the road 330 after the step of confirming the presence of the wireless charging vehicle that can be charged by receiving power wirelessly supplied from the ESS on the road 330 supplied with the ESS. Even when the wireless charging vehicle 100 is not present on the road 330, and when the power is continuously supplied, power is wasted unnecessarily, and the power stored in the battery 310 of the ESS is rapidly depleted. Thus, the charging cycle of the ESS may be shortened. However, in step of S120, when the wireless charging vehicle 100 is not present on the road 330 and the power supply is unnecessary, power loss can be prevented by cutting off the power supply.

In addition, after step S120 of controlling the ESS so that the power supply is cut off, the step may be returned to step S110 of checking the presence of the wireless charging vehicle that can be charged by receiving power wirelessly from the ESS on the road. As the above steps are performed, even after the power supply to the road 330 is stopped, the wireless charging vehicle 100 is identified on the road 330, and when power supply is required, power can be supplied again.

Meanwhile, the method comprising step S150 of determining whether a charging completion of the wireless charging vehicle by the ESS is possible may determine whether the wireless charging can be completed in the case of the amount of power required is greater than or equal to the remaining amount of power by comparing the remaining amount of power and the amount of power required. In this case, the case in which wireless charging can be completed means the case in which the ESS 300 can supply the amount of charging required to reach the amount of power required for the wireless charging vehicle 100 to travel. By comparing the amount of charging required and the amount of remaining power to determine the completion of charging is possible, the power required for charging the wireless charging vehicle 100 may be supplied.

Conversely, in step S150 of determining whether the wireless charging can be completed by the ESS, the determination unit 230 may determine whether the completion of the wireless charging is not possible (No in S150) and if the amount of remaining power is less than or equal to the amount of charging required. The method may further comprise step S160 of controlling the ESS to be charged by the system power source 500 when it is determined that wireless charging is not possible. When the amount of remaining power is less than the amount of charging required and charging of wireless charging vehicle 100 cannot be completed, the battery 310 of the ESS is charged by the system power source 500. When the amount of remaining power through charging is greater than the amount of charging required, the wireless charging can be completed through the power supply.

On the other hand, when the power supply through the ESS 300 and the charging of the ESS 300 is performed simultaneously, even when the amount of remaining power of the ESS battery 310 is less than or equal to the amount of charging required, by allowing the ESS 300 to supply power so that the wireless charging can be started firstly, and while the wireless charging is in progress, the battery of the ESS can also receive power and be charged simultaneously.

As described above, by comparing the amount of charging required and the amount of remaining power to determine whether wireless charging is possible, if the amount of remaining power is sufficient to charge the wireless charging vehicle 100, then the ESS is to supply power. On the contrary, if the amount of remaining power is insufficient to charge the wireless charging vehicle, the battery 310 of the ESS is charged so that the charging system can be cycled continuously.

The method for managing a vehicle charging system through the ESS according to the present disclosure further comprises the step of transmitting a notification of not being able to complete charging to the wireless charging vehicle if determined that the wireless charging completion is not possible after step S150 of determining whether the wireless charging vehicle by the ESS cannot be completed. A passenger receiving the notification of not being able to complete charging to the wireless charging vehicle may recognize the notification that charging cannot be completed in advance and may be allowed to consider other charging means.

Meanwhile, according to the present disclosure, the method for managing the vehicle charging system may further comprise step S180 of requesting the wireless charging vehicle 100 to update the vehicle data when a predetermined time elapsed after starting the charging of the wireless charging vehicle 100 the ESS 300. When a predetermined time elapses after charging starts, vehicle data, including the amount of charging required, may change. Since it is necessary to control the ESS to respond to the changed vehicle data, the vehicle data is updated and requested to transmit the updated vehicle data to the wireless charging vehicle 100. After step S180, the method may be performed by returning to step S110. The first step when the predetermined time has elapsed is to confirm the presence of wireless charging vehicle 100 that can be charged by receiving power wirelessly from the ESS on the road 330 supplied with power by the ESS. Likewise, the vehicle data is updated whenever a predetermined time has elapsed after charging and reflecting thereto so that the power supply can be adjusted in response to a variable generated according to the traveling of the wireless charging vehicle 100.

FIG. 4 is a flowchart showing a process performed in a charging management apparatus 200 and an ESS 300 in a method for managing a vehicle charging system through an ESS of the present disclosure, wherein the process performed in the wireless charging vehicle 100 is described in detail below with reference to FIG. 5.

FIG. 5 is a flowchart showing a process performed in a wireless charging vehicle in a method for managing a vehicle charging system through an ESS of the present disclosure. The method for managing a vehicle charging system may further comprise confirming vehicle input information including at least any one of the current location, destination, current power, or user's battery settings (S210). The method may further comprise calculating the required amount of power based on the input information of the vehicle (S220). The method may further comprise calculating the amount of power required for charging based on a value obtained by subtracting the current amount of power according to the vehicle input information from the required amount of power (S250).

Calculation of the amount of charging required and the transmission of vehicle data, including the amount of charging required, are performed in the wireless charging vehicle 100, and the vehicle input information may include a current location, a destination, a current amount of power, and a user's battery setting. Such input information may be directly input by the user or input by a navigation device or a vehicle control unit. The amount of power required may be the amount of power required to drive from the current location to the destination or may be determined according to a battery setting that is separately determined by the user. The amount of charging required is derived based on a value obtained by subtracting the current amount of power from the amount of power required so that the wireless charging vehicle 100 may secure power as much as the required amount of power when charging the amount of power required.

In this case, step S210 of confirming the vehicle input information may include a weather data on the input information and may further comprise step S230 of calculating the expected amount of power generation expected to be supplied through solar power generation based on the input information. Step S250 of calculating the amount of charging required for charging is derived based on a value obtained by deducting the expected amount of power generation from a value obtained by subtracting the current amount of power from the required amount of power.

The method may further comprise step S240 of receiving the weather data from an external server before the step of calculating the expected amount of power generation. After S250, the method may further comprise step S260 of transmitting vehicle data including the amount of charging required.

In addition to wireless charging through the ESS 300, the wireless charging vehicle 100 may additionally consider the expected power generation expected to be obtained through solar power generation if it can generate power by performing solar power generation on its own. In the case of solar power generation, the power as much as the expected amount of power generation can be supplied even there is no additional supply through the ESS. Thus, when calculating the amount of charging required, not only the current amount of power but also expected amount of power generation will be additionally deducted from the amount of power required. Accordingly, the wireless charging system of the vehicle can be used harmoniously and efficiently and can reduce the power to be supplied and promote additional energy efficiency by preventing the ESS from receiving as much power as the expected amount of power generation.

The vehicle charging system through the ESS, the method, and the apparatus for managing the same according to the present disclosure may shorten the path and process for power supply through wireless charging, and the cooperative control of the vehicle and the ESS is achieved by the charging management apparatus. Therefore, an adjusting the power supply to be optimized for each situation identified through vehicle data is possible. Thus, power loss may be prevented and energy efficiency may be increased.

Although the embodiments of the present disclosure have been disclosed for illustrative purposes, those having ordinary skill in the art should appreciate that various modifications, additions, and substitutions are possible, without departing from the scope and spirit of the disclosure.

DESCRIPTION OF REFERENCE NUMERALS

100: Wireless charging vehicle
200: Charging management apparatus
300: ESS

What is claimed is:

1. A method for managing a vehicle charging system through an Energy Storage System (ESS), the method comprising:
confirming a presence of a wireless charging vehicle, wherein the wireless charging vehicle is charged with power wirelessly supplied from the ESS on a road on which the wireless charging vehicle travels;
in response to confirming the presence of the wireless charging vehicle on the road, receiving vehicle data including an amount of charging required from the wireless charging vehicle;
receiving power data including an amount of remaining power from the ESS;
determining whether a charging completion of the wireless charging vehicle by the ESS is possible based on the vehicle data and the power data; and
in response to determining that the charging completion of the wireless charging vehicle by the ESS is possible, controlling the ESS to supply power to the wireless charging vehicle.

2. The method of claim 1, further comprising: controlling the ESS to cut off the power supply when the wireless charging vehicle is not present on the road after confirming the presence of the wireless charging vehicle that can be charged by receiving power wirelessly supplied from the ESS on the road supplied with the ESS.

3. The method of claim 2, further comprising:
after controlling the ESS to cut off, returning to confirming the presence of the wireless charging vehicle in which the power is charged by supplied wirelessly from the ESS on the road.

4. The method of claim 1, wherein
determining that the charging completion of the wireless charging vehicle by the ESS is possible when the amount of power required is greater than or equal to the amount of remaining power by comparing the amount of remaining power and the amount of power required.

5. The method of claim 1, further comprising:
confirming vehicle input information including at least any one of a current location, a destination, a current power, or user's battery settings;
determining an amount of power required based on the input information of the vehicle; and
determining the amount of charging required based on a value obtained by subtracting the current amount of power according to the vehicle input information from the amount of power required.

6. The method of claim 5, further comprising:
confirming the vehicle input information including weather data on the input information, and determining the expected amount of power generation expected to be supplied through solar power generation based on the input information,
wherein determining the amount of charging required is derived based on a value obtained by deducting the expected amount of power generation from a value obtained by subtracting the current amount of power from the amount of power required.

7. The method of claim 6, further comprising receiving the weather data from an external server before the step of determining the expected amount of power generation.

8. The method of claim 1, wherein
determining that the charging completion of the wireless charging vehicle by the ESS is not possible when the amount of remaining power is less than the amount of charging required, and
wherein the method further comprises controlling the ESS to be charged by a system power source when the completion of the wireless charging is not possible.

9. The method of claim 1, further comprising transmitting a notification of not being able to complete charging to the wireless charging vehicle when determined that the wireless charging completion is not possible after determining whether the charging completion of the wireless charging vehicle by the ESS is possible.

10. The method of claim 1, further comprising
requesting the wireless charging vehicle to update the vehicle data when a predetermined time elapsed after starting the charging of the wireless charging vehicle by the ESS.

11. An apparatus for managing a vehicle charging system through an Energy Storage System (ESS), the apparatus comprising:
a monitoring unit configured to confirm a presence of a wireless charging vehicle, wherein the wireless charging vehicle is charged by receiving power wirelessly on a road on which the wireless charging vehicle travels;
when the presence of the wireless charging vehicle on the road is confirmed, a communication unit configured to receive vehicle data including an amount of charging required from the wireless charging vehicle, and receive a power data including an amount of remaining power from the ESS;
a determination unit configured to determine whether a charging completion of the wireless charging vehicle by the ESS is possible based on the vehicle data and the power data; and
a control unit configured to control the power supply and charging of the ESS when the charging completion of the wireless charging vehicle by the ESS is possible.

12. The apparatus of claim 11, wherein
the determination unit is further configured to transmit a notification of not being able to complete charging when determined that a completion of wireless charging is not possible.

13. The apparatus of claim 11, wherein
the control unit is further configured to request the wireless charging vehicle to update and to transmit the vehicle data when a predetermined time elapsed after charging.

14. A vehicle charging system, comprising:
an Energy Storage System (ESS) including a battery configured to store power and a power supply unit implemented on the road, and the ESS configured to supply the stored power to the vehicle;
a wireless charging vehicle that is charged by receiving power wirelessly from the ESS; and
a charging management apparatus configured to control the ESS, wherein the charging management apparatus comprising:
a monitoring unit configured to confirm a presence of a wireless charging vehicle, wherein the wireless charging vehicle is charged by receiving power wirelessly on a road on which the wireless charging vehicle travels;
a communication unit configured to, when the presence of the wireless charging vehicle on the road is confirmed, receive vehicle data including an amount of charging required from the wireless charging vehicle, and configured to receive a power data including an amount of remaining power from the ESS;
a determination unit configured to determine whether a charging completion of the wireless charging vehicle by the ESS is possible based on the vehicle data and the power data; and
a control unit configured to, when the charging completion of the wireless charging vehicle by the ESS is possible, control the power supply and charging of the ESS.

15. The system of claim 14, wherein
the wireless charging vehicle is configured to:
confirm vehicle input information including at least any one of current location, destination, current power, or user's battery settings,
determine an amount of charging required based on the input information of the vehicle, and
provide the vehicle data including the amount of charging required to the charging management apparatus.

16. The system of claim 15, wherein
the wireless charging vehicle transmits changed vehicle data to the communication unit of the charging management apparatus when there is any change in the vehicle data.

17. The system of claim 15, wherein:
the vehicle input information includes weather data on the input information, and
the wireless charging vehicle receives the weather data from an external server.

18. The system of claim 14, wherein
the charging management apparatus is included in the ESS.

* * * * *